US012743646B2

(12) United States Patent
Simmons et al.

(10) Patent No.: US 12,743,646 B2
(45) Date of Patent: Sep. 22, 2026

(54) CONTROL OF HYPERFINE INTERACTION IN BROKER-CLIENT SYSTEMS

(71) Applicant: Photonic Inc., Coquitlam (CA)

(72) Inventors: Stephanie Simmons, Burnaby (CA); Joshua Kanaganayagam, Langley (CA)

(73) Assignee: Photonic Inc., Coquitlam (CA)

( * ) Notice: Subject to any disclaimer, the term of this patent is extended or adjusted under 35 U.S.C. 154(b) by 1021 days.

(21) Appl. No.: 18/045,011

(22) Filed: Oct. 7, 2022

(65) Prior Publication Data

US 2024/0135222 A1 Apr. 25, 2024

(51) Int. Cl.
*G06N 10/40* (2022.01)
*G06N 10/70* (2022.01)

(52) U.S. Cl.
CPC ............. *G06N 10/40* (2022.01); *G06N 10/70* (2022.01)

(58) Field of Classification Search
CPC ............................... G06N 10/40; G06N 10/70
See application file for complete search history.

(56) References Cited

U.S. PATENT DOCUMENTS

| | | | | |
|---|---|---|---|---|
| 9,774,401 | B1 * | 9/2017 | Borrill | H04L 9/0852 |
| 9,858,531 | B1 * | 1/2018 | Monroe | G06N 10/40 |
| 10,587,277 | B2 * | 3/2020 | Hincks | G06N 10/70 |
| 11,397,343 | B2 * | 7/2022 | Faraon | G02F 1/0036 |
| 11,423,115 | B2 * | 8/2022 | Lanting | G06N 10/40 |
| 11,494,683 | B2 * | 11/2022 | Amin | H10N 60/805 |
| 11,710,579 | B2 * | 7/2023 | Keesling Contreras | B82Y 40/00 378/70 |
| 12,282,827 | B2 * | 4/2025 | Huggins | G06N 10/20 |
| 2005/0167772 | A1 * | 8/2005 | Stoneham | B82Y 10/00 257/432 |
| 2012/0319684 | A1 * | 12/2012 | Gambetta | G06N 10/40 257/31 |

(Continued)

FOREIGN PATENT DOCUMENTS

WO 2022020951 A1 2/2022

OTHER PUBLICATIONS

Moritz Fuchs, Valentin Rychkov, and Bjorn Trauzettel. Spin decoherence in graphene quantum dots due to hyperfine interaction. American Physical Society. Phys. Rev. B 86, 085301. Aug. 1, 2012. https://doi.org/10.1103/PhysRevB.86.085301. (Year: 2012).*

(Continued)

*Primary Examiner* — Jeremy L Stanley
(74) *Attorney, Agent, or Firm* — Oyen Wiggs Green & Mutala LLP

(57) ABSTRACT

Systems and methods provide protection of a quantum state of a client quantum system of a broker-client system. The client-broker system comprises the client quantum system and a broker quantum system coupled by an anisotropic hyperfine interaction. The method comprises applying a magnetic field having an orientation and magnitude selected to suppress the hyperfine interaction. While the hyperfine interaction is suppressed, a quantum state of the broker quantum system may be altered by steps including optically exciting the broker quantum system. The method may be applied to reduce decoherence of the quantum state of the client quantum system while generating entanglement of the broker quantum system with other quantum systems.

21 Claims, 6 Drawing Sheets

(56) References Cited

U.S. PATENT DOCUMENTS

| | | | | |
|---|---|---|---|---|
| 2014/0142915 | A1* | 5/2014 | Manipatruni | G06F 30/367 703/14 |
| 2014/0291490 | A1* | 10/2014 | Hanson | H10D 48/383 250/214 R |
| 2015/0009746 | A1* | 1/2015 | Kucsko | B82Y 10/00 365/152 |
| 2016/0093420 | A1* | 3/2016 | Urzhumov | H10N 60/80 29/599 |
| 2018/0107938 | A1* | 4/2018 | Morello | H10N 60/12 |
| 2018/0330266 | A1* | 11/2018 | Simmons | B82Y 10/00 |
| 2021/0142203 | A1* | 5/2021 | Simmons | G06N 10/40 |
| 2021/0211271 | A1* | 7/2021 | Kuang | H04L 9/065 |
| 2021/0279624 | A1* | 9/2021 | Oliver | G06N 10/40 |
| 2022/0044719 | A1* | 2/2022 | Li | G06N 3/084 |
| 2022/0050043 | A1* | 2/2022 | Ozdemir | G01N 15/1456 |
| 2022/0165943 | A1* | 5/2022 | Kim | H10B 61/00 |
| 2022/0187841 | A1* | 6/2022 | Ebrahimi Afrouzi | G05D 1/0272 |
| 2022/0209036 | A1* | 6/2022 | Diggins | C09K 11/08 |
| 2022/0217211 | A1* | 7/2022 | Scarfutti | G06Q 10/067 |
| 2022/0269974 | A1* | 8/2022 | Bhaskar | G02F 3/024 |
| 2022/0366290 | A1* | 11/2022 | Simmons | G06N 10/40 |
| 2022/0366494 | A1* | 11/2022 | Cella | G06N 3/006 |
| 2022/0374239 | A1* | 11/2022 | Freedman | G06N 10/00 |
| 2023/0090257 | A1* | 3/2023 | Stern | G01C 17/32 324/252 |
| 2023/0283280 | A1* | 9/2023 | Simmons | H03K 17/92 327/527 |
| 2023/0292633 | A1* | 9/2023 | Kranz | H10D 64/27 |
| 2023/0297870 | A1* | 9/2023 | Aeppli | G06N 10/00 324/300 |
| 2024/0157146 | A1* | 5/2024 | Howard | A61N 5/0601 |
| 2024/0186007 | A1* | 6/2024 | Howard | A61B 5/076 |
| 2024/0319304 | A1* | 9/2024 | Manassen | G01R 33/323 |
| 2024/0338583 | A1* | 10/2024 | Zwierlein | G06N 10/20 |
| 2025/0217687 | A1* | 7/2025 | Awschalom | G06N 10/40 |

OTHER PUBLICATIONS

W.M. Witzel, Xuedon Hu, and S. Das Sarma. Decoherence induced by anisotropic hyperfine interaction in Si spin qubits. American Physical Society. Phys. Rev. B 76, 035212. Jul. 31, 2007. https://doi.org/10.1103/PhysRevB.76.035212. (Year: 2007).*

Simon C Benjamin, Daniel E Browne, Joe Fitzsimons and John J L Morton. Brokered graph-state quantum computation. New Journal of Physics, vol. 8. Aug. 23, 2006. DOI 10.1088/1367-2630/8/8/141. (Year: 2006).*

Goldman, M. L. et al., "Optical Control of a Single Nuclear Spin in the Solid State", Physical Review Letters, vol. 124, No. 15, Apr. 1, 2020.

Golter, D. A. et al., "Protecting a Solid-State Spin from Decoherence Using Dressed Spin States", Physical Review Letters, vol. 113, No. 23, Dec. 1, 2014.

Wu, L.-A., "Dressed Qubits in Nuclear Spin Baths", arXiv:0912.1804v2 [quat-ph], Cornell University Library, Dec. 9, 2009.

Bevilacqua, G. et al., "Restoring Narrow Linewidth to a Gradient-Broadened Magnetic Resonance by Inhomogenous Dressing", arXiv:2807.01274v5 [physics.atom-ph], Feb. 22, 2019.

Mikelsons, G. et al., "Universal Set of Gates for Microwave Dressed-State Quantum Computing", arXiv:1410.6720v2 [quant-ph], May 28, 2015.

Van Der Sar, T. et al., "Decoherence-protected quantum gates for a hybrid solid-state spin register", Nature, Apr. 5, 2013, vol. 484, pp. 82-86.

Vandersypen, L.M.K. et al., "NMR Techniques for Quantum Control and Computation", arXiv, Jun. 10, 2004, vol. quantph(0404064-V2), pp. 1-33.

Barrett, S.D. et al., "Efficient high-fidelity quantum computation using matter qubits and linear optics", Phys Rev A 71, 060310(R) (2005).

Benjamin, S.C. et al., "Brokered graph-state quantum computation", New J. Phys. 8, 141 (2006).

Bernien, H. et al., "Heralded entanglement between solid-state qubits separated by three meters", Nature 497, 86-90 (2013).

Blok, M.S. et al., "Towards quantum networks of single spins: analysis of a quantum memory with an optical interface in diamond", Faraday Discuss., 184, 173 (2015).

Cabrillo, C. et al., "Creation of entangled states of distant atoms by interference", Phys Rev A 59, 1025 (1999).

Childress, L. et al., "Coherent Dynamics of Coupled Electron and Nuclear Spin Qubits in Diamond", Science 314, 5797 (2006).

Fuchs, G.D. et al., "Gigahertz Dynamics of a Strongly Driven Single Quantum Spin", Science 326, 5959 (2009).

Hermans, S.L.N. et al., "Qubit teleportation between non-neighbouring nodes in a quantum network", Nature 605, 633-668 (2022).

Jiang, L. et al., "Coherence of an optically illuminated single nuclear spin qubit", Phys Rev Lett 100, 073001 (2008).

Kalb, N. et al., "Dephasing mechanisms of diamond-based nuclear-spin memories for quantum networks", Phys Rev A 97, 062330 (2018).

Pompili, M. et al., "Realization of a multi-node quantum network of remote solid-state qubits", Science, 372, 6539 (2021).

Reiserer, A. et al., "Robust Quantum-Network Memory Using Decoherence-Protected Subspaces of nuclear Spins", Phys Rev X 6, 021040 (2016).

* cited by examiner

CONTROL OF HYPERFINE INTERACTION IN BROKER-CLIENT SYSTEMS

FIELD

This invention relates to quantum mechanics and, in particular to methods and apparatus for preserving the quantum state of a quantum system in the presence of operations that can cause phase errors. An example application of the present technology is preserving the state of a client qubit in a client-broker system while manipulating a quantum state of a broker qubit of the client-broker system, for example to initialize the broker qubit to a desired state.

BACKGROUND

Quantum states of quantum systems may be used to store information. Since quantum systems can exist in superpositions of different quantum states the stored information may be defined by a particular superposition of quantum states. For example, a particular quantum system may have first and second quantum basis states: $|\psi 1>$ and $|\psi 2>$. Information may be stored in the quantum system by setting the system to a quantum state given by the superposition: $\alpha|\psi 1>+\beta|\psi 2>$ where $\alpha$ and $\beta$ are complex valued coefficients.

A problem with storing information in a quantum system is that the information can become randomized as a result of external interactions in a process called "decoherence". "Noise" of any type including exposure to light, other electromagnetic radiation, or fluctuating electric or magnetic fields can increase the rate of decoherence. Coupling a quantum system to interact with external systems reduces isolation of the quantum system and can increase the rate of decoherence (and reduce the characteristic time over which decoherence occurs)

Sometimes quantum information is manipulated in a system that includes a "client/broker" arrangement. In a client broker arrangement, a first quantum system (acting as "client") and a second quantum system (acting as "broker") cooperate to work with quantum information. A broker-client pair may be arranged so that interactions with external systems only involve the broker. The client may interact only with the broker. For example, interactions between a broker and a corresponding client may be used to: store quantum information in the corresponding client and/or manipulate quantum information stored in the client (e.g. by applying a quantum gate) and/or transmit quantum information from the client to another location (e.g. by quantum teleportation).

A client/broker arrangement can provide the advantage that the client is relatively protected from noise and may have a long decoherence time. However, in general a client and corresponding broker are coupled (e.g. by electromagnetic fields, wavefunction overlap or other coupling). Consequently, actions applied to the broker (e.g. to initialize the broker in a particular quantum state or to entangle the quantum state of the broker with the quantum state of one or more external quantum systems) may create "noise" at the client which may cause the decoherence time for the client to be reduced and/or randomize information about a quantum state stored in the client so that the information becomes unavailable.

The following references provide background to the present technology:

[1] Bernien, et al, Nature 497, 86-90 (2013).
[2] Pompili, et al, Science, 372, 6539 (2021).

[3] Hermans, et al, arXiv:2110.11373 (2021).
[4] Barrett, et al, Phys Rev A 71, 060310(R) (2005).
[5] Cabrillo, et al, Phys Rev A 59, 1025 (1999).
[6] Benjamin, et al, New J. Phys. 8, 141 (2006).
[7] Blok, et al, Faraday Discuss. 184, 173 (2015).
[8] Jiang, et al, Phys Rev Lett 100, 073001 (2008).
[9] Kalb, et al, Phys Rev A 97, 062330 (2018).
[10] Reiserer, et al, Phys Rev X 6, 021040 (2016).
[11] Fuchs, et al, Science 326, 5959 (2009).

There is a need for methods and systems that facilitate the use of client/broker arrangements while extending the lifetime of quantum states of the client.

SUMMARY

The present invention has a number of aspects. These include, without limitation methods systems and apparatus for preserving fidelity of quantum states in broker-client quantum systems and protecting quantum states of client quantum systems in broker-client systems; quantum information systems (e.g. quantum informatics processing systems, quantum computers); control systems for quantum information systems. Systems for controlling magnetic fields that are applied to quantum systems.

One aspect of the invention provides quantum information systems that comprise a physical broker-client system comprising a client quantum system, and a broker quantum system. A first hyperfine interaction between the client quantum system and the broker quantum system is anisotropic and there exists at least a first direction in space relative to the locations of the client quantum system and broker quantum system for which an effective hyperfine constant is zero when a magnetic field is aligned with the first direction in space. The system includes a magnet configured to apply to the broker-client system a first magnetic field along a direction that is substantially aligned with the first direction and a controller configured to cause a change in a quantum state of the broker quantum system while the magnet is applying the first magnetic field.

In some embodiments the controller is configured to reset the quantum state of the broker quantum system while the magnet is applying the first magnetic field by applying a pulse of light to the broker-client system, the pulse of light having a wavelength corresponding to a transition of the broker quantum system to an excited state.

In some embodiments the controller is configured to control the magnet to apply the first magnetic field or a third magnetic field having a direction and magnitude, wherein the hyperfine coupling between the client quantum system and the broker quantum system is greater in the presence of the third magnetic field than in the presence of the first magnetic field.

In some embodiments the strength of the hyperfine coupling for different directions of an applied magnetic field is characterized by an effective hyperfine constant determined by a hyperfine tensor having the property that there exist different directions of the applied magnetic field for which corresponding values of the effective hyperfine constant have different signs.

In some embodiments the broker-client system comprises a luminescence centre. For example, the luminescence centre may comprise a T-centre. In some embodiments the luminescence centre comprises a T-centre that comprises two $^{12}C$ nuclei.

In some embodiments the broker quantum system and the client quantum system are respectively provided by an intrinsic spin of a first particle and an intrinsic spin of a second particle. For example, in some embodiments the broker quantum system comprises an electron spin and the client quantum system comprises a nuclear spin. The nuclear spin may, for example comprise a hydrogen nucleus.

In some embodiments the substrate comprises a silicon substrate.

In some embodiments the system comprises a photonic layer on the substrate wherein the broker quantum system is optically coupled to an optical resonator and/or an optical waveguide of the photonic layer. In some embodiments the optical resonator is tuned to a frequency corresponding to a transition from one of a plurality of ground state energy levels of the broker quantum system to an excited state of the broker quantum system. In some embodiments the excited state of the broker quantum system comprises an exciton.

In some embodiments the client quantum system is a first client quantum system and the physical broker-client system comprises a second client quantum system wherein a second hyperfine interaction between the broker quantum system and the second client system is anisotropic and there exists at least a second direction in space relative to the locations of the second client quantum system and broker quantum system for which an effective hyperfine constant for the second hyperfine interaction is zero and the controller is configured to control the magnet to selectively apply the first magnetic field or a second magnetic field substantially aligned with the second direction.

In some embodiments the client quantum system is a first client quantum system and the physical broker-client system comprises a second client quantum system wherein a second hyperfine interaction between the broker quantum system and the second client system is anisotropic wherein: there exists a first and a second trajectory in spherical coordinate space. When a magnetic field is aligned with any direction on the first trajectory an effective hyperfine constant for the hyperfine interaction between the broker quantum system and the first client quantum system is zero. When a magnetic field is aligned with any direction on the second trajectory an effective hyperfine constant for the second hyperfine interaction is zero. The controller is configured to cause the magnet to apply a magnetic field to the broker-client system that has a direction that is within five degrees of: a) a direction corresponding to an intersection of the first and second trajectories; or b) a direction corresponding to the center of a line extending between the points on the first and second trajectories that correspond to the smallest angular distance between the first and second trajectories.

Another aspect of the invention provides a method for protecting a quantum state of a client quantum system of a broker-client system. The client quantum system and a broker quantum system are coupled by hyperfine coupling. The hyperfine coupling between the client quantum system and the broker quantum system is anisotropic and characterized by a magnitude of an effective hyperfine constant that depends on an orientation of an applied magnetic field relative to the locations of the client quantum system and broker quantum system. The method comprises: suppressing the hyperfine interaction by applying a first magnetic field to the broker-client system that has a magnitude and orientation selected to cause the effective hyperfine constant to have a first magnitude that is less than 10% of the largest principal value magnitude of the hyperfine tensor;

and while the hyperfine interaction is suppressed, altering a quantum state of the broker quantum system.

In some embodiments, altering the quantum state of the broker quantum system comprises optically exciting the broker quantum system.

In some embodiments, altering the quantum state of the broker quantum system comprises resetting the quantum state of the broker quantum system to a predetermined initial quantum state.

In some embodiments, the method comprises, subsequent to changing the quantum state of the broker quantum system, changing the magnetic field to a second magnetic field having a magnitude and orientation selected to cause the effective hyperfine constant to have a second magnitude that is greater than the first magnitude. For example, the first magnitude of the effective hyperfine constant is not more than 10% of the second magnitude of the effective hyperfine constant.

Another aspect of the present invention provides a method for maintaining fidelity of a quantum state of a client quantum system. The method comprises: providing a node comprising a client quantum system and a broker quantum system and characterized by an anisotropic local interaction between the client quantum system and the broker quantum system. The anisotropic local interaction has a value that depends on an orientation of an applied magnetic field relative to the locations of the client quantum system and broker quantum system such that the value ranges from a minimum value to a maximum value, where a value of zero indicates a minimum interaction strength. The method comprises suppressing the local interaction between the client quantum system and the broker quantum system by applying a magnetic field having a magnitude and direction selected to cause the strength of the local interaction to be 0±10% of the difference between the minimum value and the maximum value.

In some embodiments, the method comprises, while suppressing the local interaction between the client quantum system and the broker quantum system, resetting the broker quantum system and/or executing a protocol to entangle the broker quantum system with another quantum system.

In some embodiments, the local interaction is a hyperfine interaction.

In some embodiments, the maximum value is greater than zero and the minimum value is less than zero.

Another aspect of the present invention provides apparatus having any new and inventive feature, combination of features, or sub-combination of features as described herein.

Another aspect of the present invention provides methods having any new and inventive steps, acts, combination of steps and/or acts or sub-combination of steps and/or acts as described herein.

Various aspects and example embodiments are illustrated in the accompanying drawings and/or described in the following description.

It is emphasized that the invention relates to all combinations of the above features, even if these are recited in different claims.

BRIEF DESCRIPTION OF THE DRAWINGS

The accompanying drawings illustrate non-limiting example embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Figure 1:
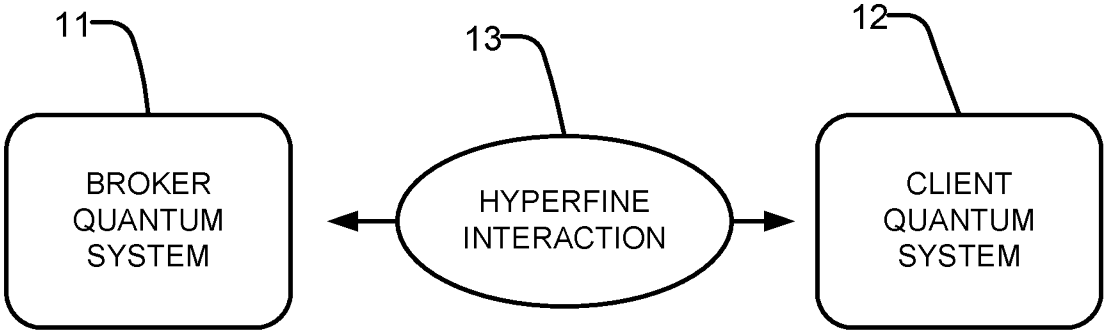
FIG. 1 is a schematic illustration showing a portion of a system which includes a first quantum system that may be used as a broker and a second quantum system that may be used as a client.

FIG. 1 schematically illustrates a portion of a system which includes a first quantum system 11 that may be used as a broker and a second quantum system 12 that may be used as a client. In some embodiments quantum systems 11 and 12 may each comprise an intrinsic spin of a quantum particle. For example, quantum system 11 may comprise an electron or hole spin. For example, quantum system 12 may comprise a nuclear spin. Quantum systems 11 and 12 interact by the hyperfine interaction 13.

Figure 2A:
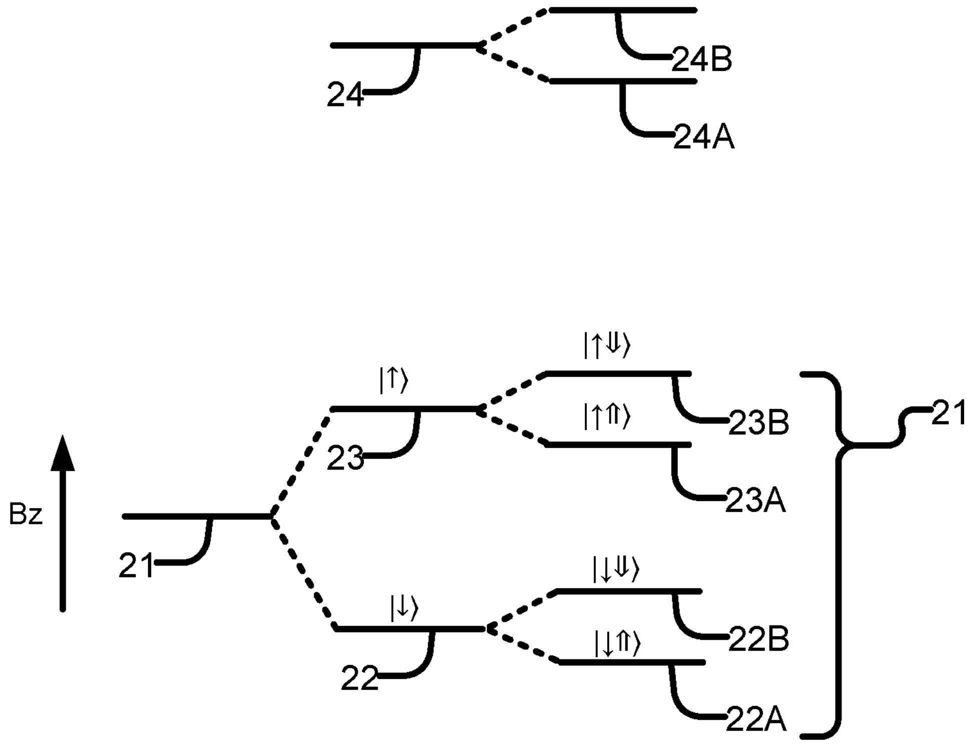
FIG. 2A is a schematic energy level diagram that illustrates energy levels associated with quantum states of an example broker quantum system in the presence of a magnetic field B in the high field limit.

FIG. 2A is a schematic energy level diagram that illustrates energy levels associated with quantum states of an example broker quantum system 11 in the presence of a magnetic field B in the high field limit. B may be a static magnetic field. In FIG. 2A the spin orientations for broker quantum system 11 are shown for the case where broker quantum system 11 has a negative gyromagnetic ratio. An electron is an example of a particle that has intrinsic spin and a negative gyromagnetic ratio.

A ground state 21 is split into two levels 22 and 23. Level 22 corresponds to quantum system 11 being spin down (i.e. in the state $|\downarrow\rangle$). Level 23 corresponds to quantum system 11 being spin up (i.e. in the state $|\uparrow\rangle$).

Broker quantum system 11 also has an excited state 24. Excited state 24 may, for example be reached from ground state 21 by an optical transition (i.e. a transition in which a photon is absorbed). The transition may, for example, comprise an orbital transition or a transition which results in creation of a bound exciton.

Levels 22, 23 and 24 are each split into two levels (22A and 22B, 23 and 23B, and 24A and 24B respectively). This splitting is caused by electromagnetic fields in the environment of client quantum system 12 including magnetic fields arising from other quantum systems local to client quantum system 12. For example, the energies associated with levels 22A, 22B, 23A and 23B may be affected by nuclear Zeeman splitting as modified by hyperfine interactions. The hyperfine interactions may comprise hyperfine interactions between client quantum system 12 and broker quantum system 11.

States 22A and 22B respectively correspond to states in which client quantum system 12 is spin up (i.e. the combined state of quantum systems 11 and 12 is $|\downarrow\Uparrow\rangle$) and client quantum system 12 is spin down (i.e. the combined state of quantum systems 11 and 12 is $|\downarrow\Downarrow\rangle$). Similarly, States 23A and 23B respectively correspond to states in which client quantum system 12 is spin up (i.e. the combined state of quantum systems 11 and 12 is $|\uparrow\Uparrow\rangle$) and client quantum system 12 is spin down (i.e. the combined state of quantum systems 11 and 12 is $|\uparrow\Downarrow\rangle$).

While it is technically incorrect to consider broker quantum system 11 and client quantum system 12 in isolation when client quantum system 12 is coupled to interact with broker quantum system 11 (because in this case the quantum states of the coupled client and broker quantum systems are not independent from one another) it is instructive to consider what would be different if client quantum system 12 and broker client system 11 were isolated from one another and how client quantum system 12 may be affected by changes to the state of broker quantum system 11 where there is interaction between broker quantum system 11 and client quantum system 12.

Figure 2B:
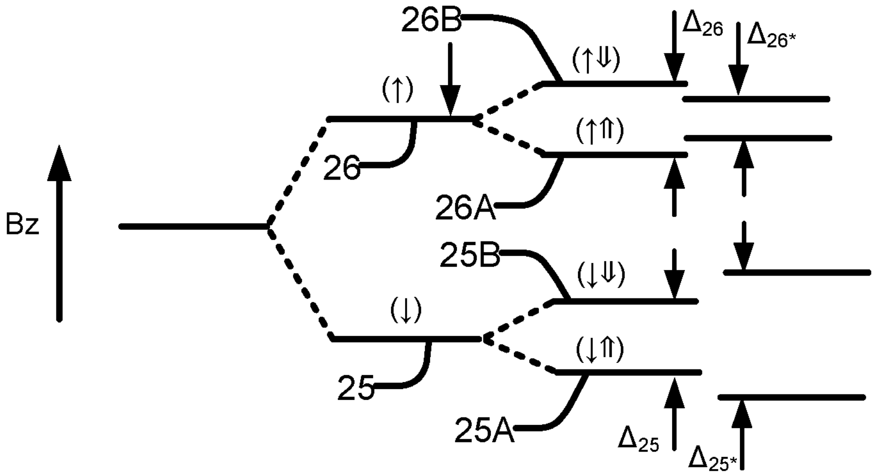
FIG. 2B is a simplified energy level diagram for the ground state of a broker quantum system and for the combined system made up of a client quantum system and the broker quantum system.

FIG. 2B is an example simplified energy level diagram for the ground state of broker quantum system 11 (energy levels 25 and 26) and for the combined system made up of client quantum system 12 and broker quantum system 11 (energy levels 25A, 25B, 26A and 26B). FIG. 2B treats the energy levels of the combined system as being the sum of the energy levels of client quantum system 12 and broker quantum system 11 each taken in isolation. In FIG. 2B spin orientations are presented in round brackets to acknowledge that it is not strictly correct to treat energy levels 25, 26, 25A, 25B, 26A or 26B as being energy eigenstates of either broker quantum system 11 or client quantum system 11 or their combination for the real case in which client quantum system 12 is coupled to broker quantum system 11 by some interaction.

Where broker quantum system 11 has spin ½, an isolated broker quantum system 11 may be spin up: ($\uparrow$) or spin down: ($\downarrow$). In the presence of magnetic field B. These states have different energy levels 25 and 26. For example, where broker quantum system 11 is an electron, energy levels 25 and 26 are separated by an amount $\Delta E_{11}=|\gamma_e|B_0$ where $\gamma_e$ is the gyromagnetic ratio of the electron and $B_0$ is the magnitude of the magnetic field.

Where client quantum system 12 has spin ½, client quantum system 12 may be spin up: ($\Uparrow$) or spin down: ($\Downarrow$). In the presence of magnetic field B, these states have different energy levels. For example where client quantum system 12 comprises an isolated nuclear spin, these energy levels are separated by an energy difference $\Delta E_{12}=\gamma_n B_0$ where $\gamma_n$ is the gyromagnetic ratio of the nuclear spin. Therefore, in FIG. 2B, energy levels 25 and 26 are respectively split into energy levels 25A, 25B and 26A, 26B as a result of the energy difference between the spin up and spin down states of client quantum system 12 in the presence of an electromagnetic field (e.g. magnetic field B) and the splittings ($\Delta_{25}$ between levels 25A and 25B and $\Delta_{26}$ between levels 26A and 26B) would be equal (i.e. $\Delta_{25}=\Delta_{26}=\Delta E_{12}$).

Hyperfine interactions between broker quantum system 11 and client quantum system 12 can perturb the splitting of levels 25 and 26 such that the energy differences $\Delta_{25}$ and $\Delta_{26}$ become $\Delta_{25*}$ and $\Delta_{26*}$, respectively, where $\Delta_{25*}$ and $\Delta_{26*}$ are unequal. For example, hyperfine splitting may cause the splitting between levels 25A and 25B to change to $\Delta_{25*}$ and the splitting between levels 26A and 26B to change to $\Delta_{26*}$, as shown in FIG. 2B. In the high field limit, the perturbation to the levels is such that $$\Delta_{25*} = \Delta_{25} + \frac{A}{2} \text{ and } \Delta_{26*} = \Delta_{26} - \frac{A}{2},$$

and for $\Delta_{25}=\Delta_{26}$, $\Delta_{25*}-\Delta_{26*}=A$, where A is the effective hyperfine constant.

Broker quantum system 11 and client quantum system 12 may, for example, exist in a solid state host material. For example, broker quantum system 11 and client quantum system 12 may each be provided by spins associated with the same physical structure. The physical structure may, for example be: an impurity atom in a substrate (e.g. a silicon substrate), a colour centre in a crystalline material such as diamond or silicon (e.g. the T-centre, G centre, I centre or M centre in silicon).

There are many circumstances where it is desirable to store quantum information in client quantum system 12 while manipulating the quantum state of broker quantum system 11 (e.g. when resetting the state of broker quantum system 11 to a specific desired state or when attempting to entangle the quantum state of broker quantum system 11 with some other quantum system. Preserving the fidelity of the quantum information stored in client quantum system 12 during such events presents a problem because the same hyperfine interactions between broker quantum system 11 and client quantum system 12 that affect the energy levels of broker quantum system 11 can also affect the magnitude of the splittings $\Delta_{25}$ and $\Delta_{26}$. This, in turn, can cause a loss of fidelity of the quantum state of client quantum system 12.

Consider the case where client quantum system 12 is in the quantum state given by $|\psi\rangle = \propto|\Uparrow\rangle + \beta|\Downarrow\rangle$ where $\alpha$ and $\beta$ are normalized complex coefficients. This quantum state represents information that it is desired to preserve. The quantum state of an isolated quantum system evolves in time according to the Schroedinger equation $$\left(\text{i.e. } H|\psi(t)\rangle = i\hbar\frac{\partial}{\partial t}|\psi(t)\rangle\right)$$

where H is the Hamiltonian and $\hbar$ is Planck's constant divided by $2\pi$.

Where the Hamiltonian is constant and $|\psi\rangle$ is a stationary state then $|\psi\rangle$ evolves in time by acquiring a phase (i.e. $|\psi(t)\rangle = e^{-iHt/\hbar}|\psi(0)\rangle$ ). The fidelity of the state of client quantum system 12 is preserved since, in general, H and t are known and so the phase factor can be readily determined and compensated for, if desired.

Time evolution of a superposition of two energy eigenstates (e.g. the states $|\Uparrow\rangle$ and $|\Downarrow\rangle$ of client quantum system 12) is given by: $|\psi(t)\rangle = \propto|\Uparrow\rangle e^{-iE\Uparrow t/\hbar} + \beta|\Downarrow\rangle e^{-iE\Downarrow t/\hbar}$ where $E\Uparrow$ and $E\Downarrow$ are respectively the energies of the states $|\Uparrow\rangle$ and $|\Downarrow\rangle$ of client quantum system 12. It can be seen that the relative phase of the states $|\Uparrow\rangle$ and $\Downarrow$ after a time t depends on the values of $E\Uparrow$ and $E\Downarrow$. As long as $E\Uparrow$ and $E\Downarrow$ are known and the time t is known then the phases applied to the states $|\Uparrow\rangle$ and $|\Downarrow\rangle$ can be readily determined and compensated for, if desired. In most cases, to apply the quantum information stored in the state of client quantum system 12 it is sufficient if the relative phase of the states $|\Uparrow\rangle$ and $|\Downarrow\rangle$ is known. The relative phase of the states $|\Uparrow\rangle$ and $|\Downarrow\rangle$ depends on the energy difference $E\Uparrow - E\Downarrow$ (i.e. the splitting $\Delta_{25}$ or $\Delta_{26}$ depending on the state of broker quantum system 11).

Since the quantum state of broker quantum system 11 (whether that broker quantum state is a basis state such as $|\uparrow\rangle$ or $|\downarrow\rangle$ or a superposition of basis states) can affect the splittings $\Delta_{25}$ and $\Delta_{26}$ of energy levels of client quantum system 12 by way of the hyperfine interaction, the above analysis shows that the quantum state of broker quantum system 11 will affect the time evolution of the quantum state of client quantum system 12 by altering the rates at which individual energy eigenstates of client quantum system 12 acquire phase if broker quantum system 11 interacts with client quantum system 12 in a way which causes splittings $\Delta_{25}$ and $\Delta_{26}$ to be unequal. Each period of time that broker quantum system 11 spends in a superposition of different states which individually would cause different splittings of the energy levels of client quantum system 12 has the effect of a controlled phase gate on client quantum system 12.

If there is a period when:

- the quantum state of broker quantum system 11 is not known; or
- the amount of time that broker quantum system 11 spends in different quantum states that affect the energy levels $E\Uparrow$ and $E\Downarrow$ is not known; or
- broker quantum system 11 spends time in an unknown superposition of states which affect the splittings of the energy levels of the client quantum system 11;

then, even if the quantum state of client quantum system 12 was known precisely at the start of the period, by the end of the period the energy eigenstates of client quantum system 12 will have acquired an unknown relative phase difference. Because the phase difference is not known it cannot be compensated for. Even if the quantum state of broker quantum system 11 is known at all material times, the phase difference that accumulates between the quantum states $|\Uparrow\rangle$ and $|\Downarrow\rangle$ of client quantum system 12 are distinct for the different broker branches 25, 26 of FIG. 2B. This makes calculating and compensating for the phase difference more complicated.

For example, creating entanglement of broker quantum system 11 with another quantum system can cause loss of fidelity of quantum information stored in the state of client quantum system 12. Suppose that it is desired to cause the quantum state of broker quantum system 11 to be entangled with the quantum state of an external quantum system by way of an optical network. Entanglement may be created, for example, to facilitate teleporting the quantum state of client quantum system 12 to another quantum system or teleporting a quantum gate to act on client quantum system 12.

Any of a variety of protocols may be applied for entangling the quantum states of two quantum systems. Performing such protocols on broker quantum system 11 may cause broker quantum system 11 to be in unknown superpositions of the states $|\uparrow\rangle$ and $|\downarrow\rangle$ and/or spend unknown time in states $|\uparrow\rangle$ or $|\downarrow\rangle$ or a superposition of these states. This can cause loss of fidelity of a state of client quantum system 12 as described above.

Some entanglement protocols are probabilistic in nature (meaning that each attempt to entangle two quantum systems using such protocols has a certain probability of failure). This tends to exacerbate the problem of loss of fidelity of client quantum system 12 since each time the entanglement protocol is executed (in each entanglement attempt) broker quantum system 11 will pass through a series of quantum states. As discussed above, a phase difference between states of client quantum system 12 accumulates at a rate that depends on the state of broker quantum system 11. This typically causes quantum basis states of client quantum system 12 to acquire unknown relative phases as a result of one or a succession of entanglement attempts. Some example protocols for creating entanglement between quantum systems are described in Refs. [4] and [5].

Many protocols for entangling two spaced-apart quantum systems are optically mediated. In such protocols, single photons that have quantum states related to quantum states of the two quantum systems to be entangled (e.g. photons emitted by quantum transitions in one or both of the quantum systems) may be transported via optical paths to locations where interactions with or among the one or more photons may take place (e.g. at a Bell state analyzer).

Particularly if the optical paths are lossy any individual attempt to entangle the quantum systems may fail. The average number of attempts required to entangle the quantum systems will increase with the lossiness of the optical paths and depends on details of the protocol.

Entanglement protocols generally involve several steps. When an entanglement attempt fails, the quantum states of the associated quantum systems are typically unknown and it is necessary to reinitialize the quantum systems involved (here, broker quantum system 11) and restart the process for creating the desired entangled state.

An example way to "reset" broker quantum system 11 is "optical spin polarization" which applies optical pumping to broker quantum system 11. The optical pumping illuminates broker quantum system 11 with an optical pumping field made up of photons which have energies (frequencies) that correspond to a spin-selective transition from a first one of spin states 22 and 23 of ground state 21 to excited state 24. The optical pumping field does not cause a transition from the other (second one) of spin states 22 and 23 to excited state 24 because the energy of the photons does not match the energy of the transition from the second one of spin states 22 and 23 to excited state 24.

Excited state 24 may subsequently decay to one of ground spin states 22 and 23 by emitting a photon. The probability that excited state 24 will decay to ground spin state 22 or ground spin state 23 is determined by a branching ratio which depends on characteristics of the broker quantum system. The optical pumping field is applied for a time long enough that broker quantum system is, with a desired degree of certainty (e.g. a probability that is at least equal to a threshold that is 75% or more), in the second one of spin states 22 and 23.

During the optical pumping process broker quantum system 11 may spend variable (and unknown) amounts of time in each of states 22, 23 and 24. The variable amount of time spent by broker system 11 in each of states 22, 23, 24 will affect time evolution of the quantum state of client quantum system 12 in variable ways which reduce the fidelity of the quantum state of client quantum system 11 and can make it impossible to recover quantum information stored in the quantum state of client quantum system 12. Resetting broker quantum system 11 can result in significant loss of fidelity of the quantum state of client quantum system 12, especially if many resets are performed or if individual resets occur over a period long enough to cause significant phase change of the quantum state of client quantum system 12.

It can be seen that each attempt at entangling broker quantum system 11 with an external quantum system can involve multiple steps in which the quantum state of broker quantum system 11 is altered. Each of these steps can contribute to a loss of fidelity of the quantum state of client quantum system 12 with the result that it is not possible to recover any information stored in the quantum state of client quantum system 12.

Other operations (unitary or non-unitary) that manipulate quantum states of broker quantum system 11 (e.g. by applying optical signals to the broker quantum system) may also decohere the quantum state of an associated client quantum system 12.

Ref. [7] presents a model for client dephasing during broker reset. According to the model the fidelity of a client quantum system remaining after N stochastic resets of the corresponding broker quantum system can be written as:

$$F = \frac{1}{2} + \frac{1}{2^{N+1}}\left(1 + e^{\frac{1}{2}T_{reset}^2 d\omega^2}\right)^2 \tag{1}$$

where $\tau_{reset}$ is the characteristic time required to reset the broker quantum system and $d\omega$ is the change in energy the client quantum system experiences upon a flip of the spin of the broker quantum system. According to this model, decoherence of the client quantum system can be reduced by reducing the broker reset time or by reducing the change in energy eigenstates of the client quantum system resulting from flips of the spin of the broker quantum system.

The present technology ameliorates the above problem by using for client quantum system 11 and broker quantum system 12 a physical system in which the hyperfine coupling between client quantum system 11 and broker quantum system 12 has special properties. Specifically:

- the hyperfine coupling is anisotropic (i.e. represented by a hyperfine tensor that has an anisotropic component); and
- there exists a direction in space (relative to the locations of the client and broker quantum systems) for which an effective hyperfine constant is zero (or at least small).

Fortunately there are broker-client systems for which the hyperfine coupling has the above properties.

A hyperfine tensor is a mathematical object that describes the nature of the hyperfine interaction between the broker and client quantum systems (e.g. between electron spin and nuclear spin). A hyperfine tensor may be represented by a matrix in a Cartesian coordinate system. When the hyperfine tensor is represented by a matrix that is symmetric, the tensor can be understood geometrically as defining three orthogonal axes, with a different hyperfine coupling value associated with each of the axes.

When a large enough magnetic field is applied to the client-broker system the hyperfine coupling between broker and client can be represented by an effective hyperfine constant. The value of the effective hyperfine constant depends upon the orientation of the applied magnetic field relative to the axes associated with the hyperfine tensor. The effective hyperfine constant determines the strength of the interaction between the broker and client quantum systems for each direction of the applied magnetic field.

The value of the effective hyperfine constant is given by:

$$A = A_x\left(\frac{B_x}{B}\right)^2 + A_y\left(\frac{B_y}{B}\right)^2 + A_z\left(\frac{B_z}{B}\right)^2 \tag{2}$$

where A is the effective hyperfine constant, $A_x$, $A_y$, and $A_z$ are respectively principal hyperfine values associated with x, y and z orthogonal axes associated with the hyperfine tensor, B is the magnitude of the applied magnetic field and $B_x$, $B_y$, and $B_z$ are respectively the x, y and z components of the applied magnetic field associated with x, y and z orthogonal axes associated with the hyperfine tensor.

For systems characterized by well-described hyperfine tensors (i.e. systems for which the hyperfine interaction can be modeled sufficiently accurately by a Hamiltonian term involving the hyperfine tensor without additional Hamiltonian components that describe higher order hyperfine behaviors) the effective hyperfine constant, A, is the sum of hyperfine axis values $A_{x,y,z}$, with weightings determined by magnetic field direction. Since these weightings add to unity, all possible values for the effective hyperfine constant fall within the closed interval:

$$\left[\min_{i=x,y,z} A_i,\ \max_{j=x,y,z} A_j\right].$$

If one of the principal hyperfine axis values is positive, and another negative, it follows that there are magnetic field directions such that the effective hyperfine constant, A, vanishes to 0.

The magnetic field direction that corresponds to the effective hyperfine constant vanishing is in general not unique. Typically there are trajectories in the spherical coordinates (θ, φ) such that all directions lying on the trajectory correspond the effective hyperfine constant vanishing. For some broker client systems these trajectories form spherical conics.

It is also the case that if any of the hyperfine axis values $A_{x,y,z}$, has the value 0 then the effective hyperfine constant, A, can be set to zero by applying the magnetic field in the direction of the corresponding axis (x,y,z). It is also the case that if the absolute value of any of the hyperfine axis values $A_{x,y,z}$, is sufficiently small (even if non-zero) then hyperfine coupling between the broker and client quantum systems may be minimized by applying the magnetic field in the direction of the corresponding axis (x,y,z).

Methods according to some embodiments of the invention apply the above findings to protect client quantum system 12 from decoherence due to hyperfine interaction with broker quantum system 11.

In some embodiments hyperfine coupling is selectively turned on between a broker quantum system 11 and a client quantum system 12 during periods when hyperfine coupling is desired by orienting an applied magnetic field in a direction such that the effective hyperfine constant is not zero. The hyperfine coupling between a broker quantum system 11 and a client quantum system 12 may subsequently be effectively turned off by orienting an applied magnetic field in a direction such that the effective hyperfine constant is zero or close to zero when hyperfine coupling is not desired (e.g. when resetting the broker quantum system).

In some embodiments client quantum system 12 is a spin ½ particle such as a nuclear spin that has spin states $|\Uparrow\rangle$ and $|\Downarrow\rangle$ and broker quantum system 11 is also a spin ½ particle such as an electron that has spin states $|\uparrow\rangle$ and $|\downarrow\rangle$.

There are applications in which it is advantageous to use as client quantum systems spins that are relatively strongly coupled to a corresponding broker quantum system. Such spins are generally local to the corresponding broker quantum system. Quantum systems that are local to a broker quantum system are advantageous for use as clients because the presence of a suitable local quantum system can be guaranteed (e.g. where the broker and client are each a spin in a specific known physical structure such as a T-centre). Also, where client and broker are each a spin of a known physical structure the broker-client coupling strength can be known in advance since the physical relationship between the client and broker quantum systems is determined by the geometry of the physical structure in which they are both located. The coupling interaction for physical structures of a particular type may be determined experimentally and/or by computer simulations based on the known geometry. Also, certain characteristics of the coupling interaction may be inferred from symmetries of the physical structure.

In some embodiments the present technology is applied to a client-broker system in which the client and broker are relatively strongly coupled. Here, 'relatively strongly coupled' means having an interaction strength of more than 1 MHz (i.e. an interaction energy E given by E=hv where h is Planck's constant which has a value of approximately 6.626×10–34 J·Hz–1) and v is a frequency. In this case, v is at least 1 MHz.

One example of a physical system that includes quantum systems that may be used as broker quantum system 11 and an associated client quantum system 12 for which hyperfine coupling has the properties described above is a T-centre. A T-centre is a type of colour centre in silicon.

Figure 3:
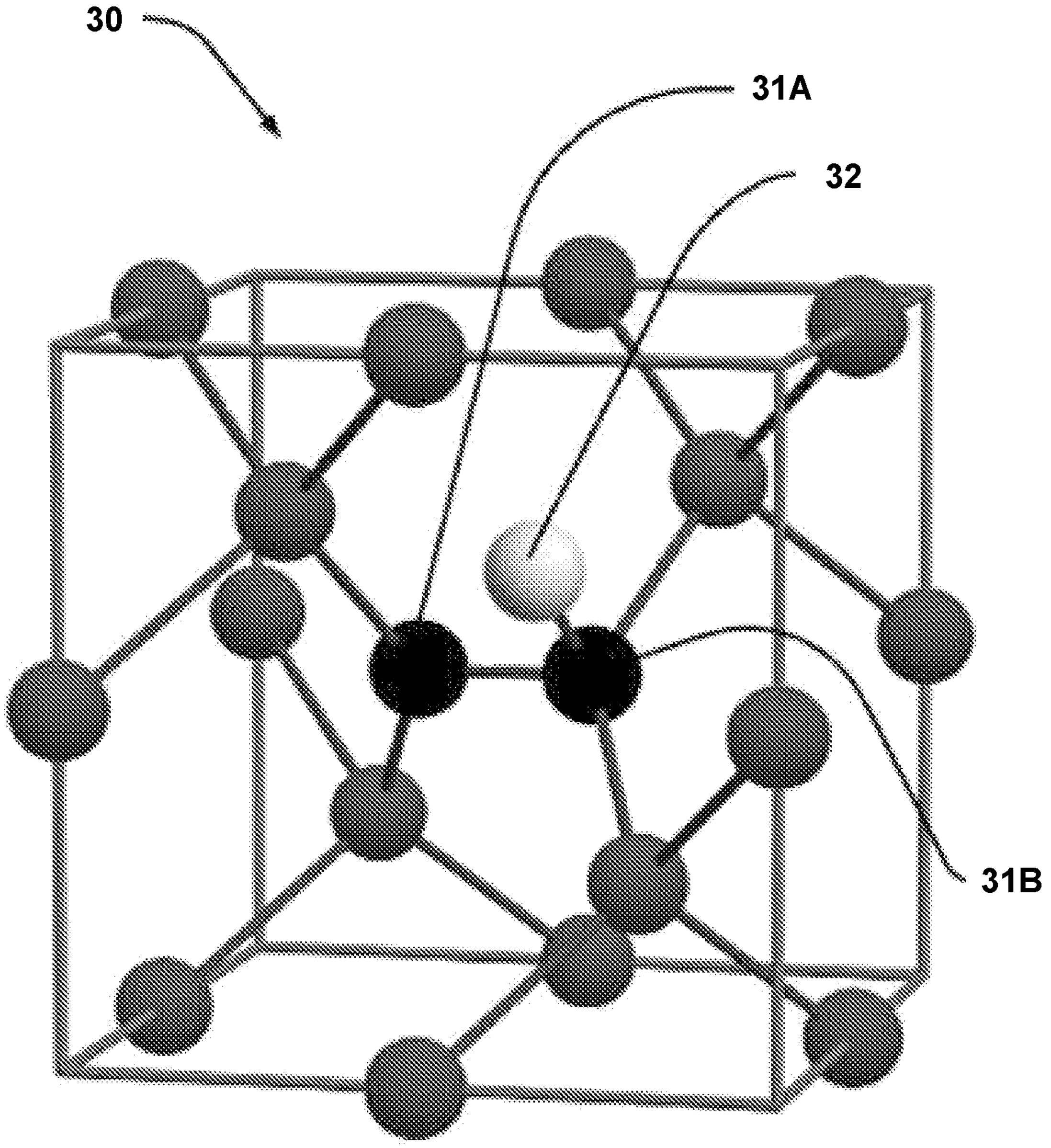
FIG. 3 is a perspective view of a model which shows the structure of a T-centre.

FIG. 3 is a model which shows the structure of a T-centre 30. The T-centre is a structure in which a silicon atom in a silicon crystal has been replaced by two carbon atoms 31A and 31B and a hydrogen atom 32 bonded to carbon atom 31B. Carbon atom 31A has one unpaired electron. The spin state of the unpaired electron (which has spin ½) of carbon atom 31A may be used as a broker quantum system 11. The nucleus of hydrogen atom 32 (which has spin ½) may serve as a client quantum system 12. Hyperfine coupling between the hydrogen nucleus and electron may be controlled as described herein.

In some embodiments, one or both of the carbon atoms in a T-centre are the carbon isotope $^{13}C$. Nuclei of carbon-13 atoms have a spin of ½ and may be used as additional client quantum systems (by contrast, nuclei of the carbon isotope $^{12}C$ do not have a net spin).

T-centres have properties that make their spins particularly good for use as storing quantum information. These properties include:

- T-centres exhibit long spin coherence times (>2.1 ms electron and >1 s nuclear spin);
- T-centres have narrow optical linewidths (<30 MHz);
- T-centres can couple to O-band photons (wavelengths including about 1326 nm);
- A T-centre can provide multiple (e.g. up to 4) accessible spin manifolds;
- A T-centre couples weakly but controllably to lattice strain;
- A T-centre couples weakly but controllably to electric fields;
- A T-centre can support excitons which may be used to store quantum information (e.g. in hole spins).

T-centres may be formed in a silicon body, for example, by irradiating the silicon body with high energy carbon and high energy hydrogen. This irradiation is followed by high temperature annealing to activate T-centre formation. In some embodiments T-centres are formed at desired locations within a silicon body by applying a hard mask to the silicon body and irradiating the desired locations through apertures in the hard mask.

The spins in a T-centre can be accessed optically through energy transitions between the T ground state and a bound exciton excited state known as TX0. The transition from the T ground state to the TX0 state involves the creation of a bound exciton, which contains an electron and hole. The electron spin of the exciton combines with the original ground state electron spin to form a singlet. During optical transitions between the T ground state and TX0 excited state, emitted photons can be entangled to the electron/hole spin state.

The transition between the T ground state and the TX0 state has an energy that corresponds to photons having wavelength of 1326 nm, which is conveniently in the telecommunications O-band.

The effect of an applied magnetic field on the energy eigenvalues of the T-centre may be determined using the Hamiltonian of the T-centre. The Hamiltonian is given in frequency units by:

$$H = \frac{g_e \mu_B}{h} B \cdot S - \frac{g_n \mu_N}{h} B \cdot I + SAI \quad (3)$$

where: $g_e$ and $g_n$ respectively denote the electron and nuclear g-factors, $\mu_B$ and $\mu_N$ respectively denote the Bohr and nuclear magnetons, S; I respectively denote the electron and nuclear spins (as dimensionless Pauli operators), A denotes the anisotropic hyperfine tensor and h is Planck's constant.

The client nuclear spin is desirably isolated from the broker spin during inter-broker operations, which involve a broker quantum system undergoing transitions between the ground and TX0 states. If the nuclear spin splitting in the T ground state, is different from the nuclear spin splitting when the T-centre is in the excited state TX0, (typically this is the case—the splittings between states 22A and 22B, states 23A and 23B, and states 24A and 24B shown in FIG. 2A are typically different from one another as a result of hyperfine interactions) then each transition of the broker quantum system between its ground and excited state will contribute a phase difference to the quantum state of the client (nuclear) spin. Such accumulated phases contribute to degradation of the fidelity of the quantum state of the client quantum system. The changes in energy of the nuclear spin states that result from transitions between the ground and excited TX0 states can have the effect of undesired controlled phase gates that act on the nuclear (client) spin and cause fidelity of the client quantum state to be reduced.

The T-centre Hamiltonian is simplest when the carbon atoms in the T-centre are $^{12}C$ since these atoms do not contribute spins to the system. In this case the Hamiltonian only depends on the spins of the electron and hydrogen nucleus. The resulting ground state Hamiltonian acts on a four-dimensional Hilbert space and is solvable (e.g. using numerical methods). Since the energy eigenvalues are solvable, the time evolution of the system can be determined.

Numerical methods may be used to find one or more magnetic field values that may be used to effectively isolate a client quantum system (e.g. nuclear spin) from a broker quantum system (e.g. electron spin) in a T-centre or other system that provides quantum systems operable as client-broker. In addition or in the alternative, suitable magnetic fields which correspond to effective isolation of a broker and client may also be determined experimentally.

In the case where only an electron and nuclear spin contribute spin the preserved nuclear spin splitting may be calculated using the energy eigenvalues in terms of magnetic field. The resulting relationship can be rearranged to solve for the magnetic fields which can provide effective isolation of the client nuclear spin from the broker electron spin.

There are four possible combinations of $^{13}C$ and $^{12}C$ in a T-centre, namely: $^{12}C$-$^{12}C$, $^{12}C$-$^{13}C$, $^{13}C$-$^{12}C$, and $^{13}C$-$^{13}C$. These different isotopic combinations result in different coupling strengths between the spins that may be used as client quantum systems and the spins that may be used as broker quantum systems. Where one or both of the carbon atoms in the T-centre are $^{13}C$ the ground state Hamiltonian will act on an 8 or 16-dimensional vector space respectively.

For some client-broker systems a suitable magnetic field direction may be determined by finding analytical solutions of Equation (2). The solution manifold for Equation (2) is made up of spherical conics. For some client-broker systems an analytical solution that identifies those magnetic fields that can provide effective isolation of a client quantum system from a broker quantum system is not possible or not findable. However, numerical methods can be used to solve for the magnetic fields that maximize isolation of a client quantum system from a broker quantum system.

A general approach to finding a magnetic field direction (or directions) for which a client quantum system is isolated from a corresponding broker quantum system is to determine the magnitude of the splitting of the client ground state as a function of magnetic field direction for each relevant state of the broker quantum system and to then find a direction or directions for which the splitting is the same (or the same to within a threshold) for all relevant states of the broker quantum system.

For example, for a T-centre in which the carbon atoms are both $^{12}C$ the states of the broker that must be considered are electron spin up, electron spin down, and one of hole spin up and hole spin down of excited state TX0 (it is usually possible to selectively excite the broker to a chosen one of the hole spin up and hole spin down states such that the other of the hole spin up and hole spin down excited states does not need to be considered).

Fidelity upon measurement of a given superposition of client spin states will decrease when the energy difference of the client spin states depends on the broker spin state. If the hyperfine interaction is eliminated, then the fidelity upon measurement of a client (e.g. hydrogen nucleus) superposition state will be independent of operations that manipulate or change the broker spin state.

There is no known hyperfine interaction between the hydrogen nuclear spin and the hole when the T-centre is in the TX0 excited state. Therefore, with the T-centre in the TX0 state the splitting of the hydrogen nucleus (i.e. the difference between energy levels 24A and 24B in FIG. 2A) is the energy difference between the nuclear spin up and spin down states which is given by:

$$\gamma_n B_0 \quad (4)$$

where: $B_0$ is the magnitude of the magnetic field. In this example case the problem then reduces to finding magnetic field magnitude and direction(s) for which the splitting of the hydrogen nuclear spin is also given by expression (4) for each of: the electron is spin up and the electron is spin down.

In some embodiments, calculations to find the desired magnetic field magnitude and direction can be simplified by selecting a magnitude of the magnetic field that is sufficiently high (e.g. 300 mT or higher for a T-centre).

In solving for a suitable magnetic field that may be applied to effectively isolate a client quantum system from a broker quantum system it can be convenient to represent the Hamiltonian using the basis states $|\uparrow\Uparrow\rangle$, $|\uparrow\Downarrow\rangle$, $|\downarrow\Uparrow\rangle$, and $|\downarrow\Downarrow\rangle$) although other bases may be used.

One aspect of the present technology provides methods and apparatus for in effect turning off the hyperfine interaction between a broker quantum system and an associated client quantum system. These methods and apparatus may be applied to turn off the hyperfine interactions at least during resets of the broker quantum system, thereby reducing or eliminating dephasing of the quantum state of the client quantum system which would normally result from the resetting of the broker quantum system. The hyperfine interaction may be "on" at times when it is desirable to use the hyperfine interaction. For example, when the hyperfine interaction is being applied to drive two qubit gates—between the client and the broker quantum systems. Switching the broker-client system between the state where the hyperfine interaction is effectively off to a state where the hyperfine interaction is on can be achieved by changing a magnitude and/or direction of the applied magnetic field.

Some solid state systems include plural spins that may be used as broker quantum systems and/or client quantum systems. For example, the T-centre in silicon includes several nuclear spins that may each be used as a client quantum system. NV centres in diamond may be coupled to plural nearby $^{13}C$ nuclear spins that may each serve as a client quantum system.

Plural Client Quantum Systems

Figure 4:
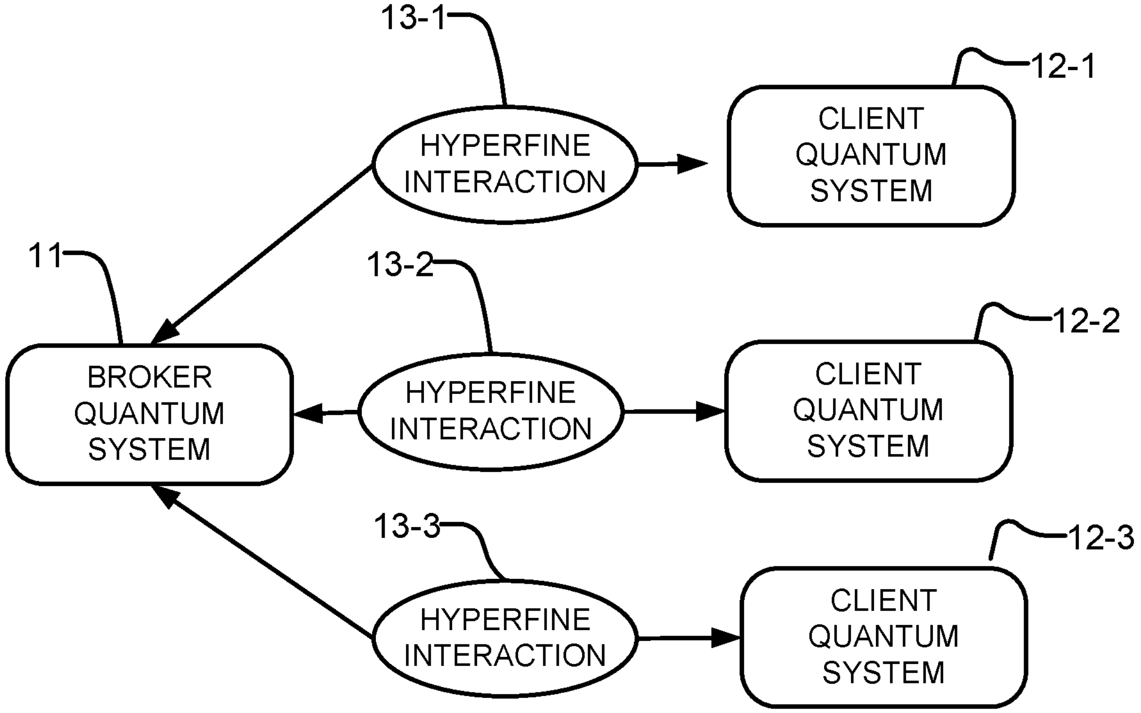
FIG. 4 is a schematic illustration showing a broker-client system that includes one broker quantum system associated with plural local client quantum systems.

In some applications plural client quantum systems may be associated with the same broker quantum system. This is illustrated in FIG. 4 which shows a broker-client system 40 that includes one broker quantum system 11 (e.g. an electron spin) associated with three local client quantum systems 12 (identified individually as 12-1, 12-2 and 12-3). The client quantum systems may each be a nuclear spin. For example, a T-centre may include one or two $^{13}C$ nuclear spins as well as one hydrogen nuclear spin that may be each applied as a client quantum system. FIG. 4 also shows hyperfine interactions 13-1, 13-2 and 13-3 between broker quantum system 11 and client quantum systems 12-1, 12-2 and 12-3 respectively. In general, hyperfine interactions 13-1, 13-2 and 13-3 have different hyperfine tensors.

Following the same procedure as above and once again working in the high-field limit, if plural client quantum systems are present it may not be possible to find a single magnetic field direction and magnitude that simultaneously protects all of the clients (e.g. by making the splitting between basis states of each of the clients equal for different states of the broker) because the hyperfine interaction with each of the client quantum systems is typically characterized by a different hyperfine tensor. Even if complete protection of all of plural client quantum systems is not possible one may determine a magnetic field magnitude and direction that reduces the effect of changes in the state of a broker quantum system on some or all of the client quantum systems.

In some embodiments, there exists a first trajectory in spherical coordinate space such that when a magnetic field is aligned with any direction belonging to the first trajectory an effective hyperfine constant for the hyperfine interaction between the broker quantum system and a first client quantum system is zero and there also exists a second trajectory in spherical coordinate space such that when a magnetic field is aligned with any direction belonging to the second trajectory an effective hyperfine constant for the hyperfine interaction between the broker quantum system and the second client quantum system is zero. In some cases the first and second trajectories intersect. In that case a magnetic field may be applied to the broker-client system that is oriented in a direction that corresponds to or is close to (e.g. within 1 degree of or 2 degrees of or 5 degrees of an intersection of the first and second trajectories. In cases where the first and second trajectories do not intersect a magnetic field may be applied to the broker-client system that is oriented in a direction that corresponds to a point on a line extending between the points on the first and second trajectories that correspond to the smallest angular distance between the first and second trajectories (or is close to the line (e.g. within 1 degree of or 2 degrees of or 5 degrees of a point on the line). In some embodiments the direction of the magnetic field is close to a point at the centre of the line.

Example Method

Figure 5:
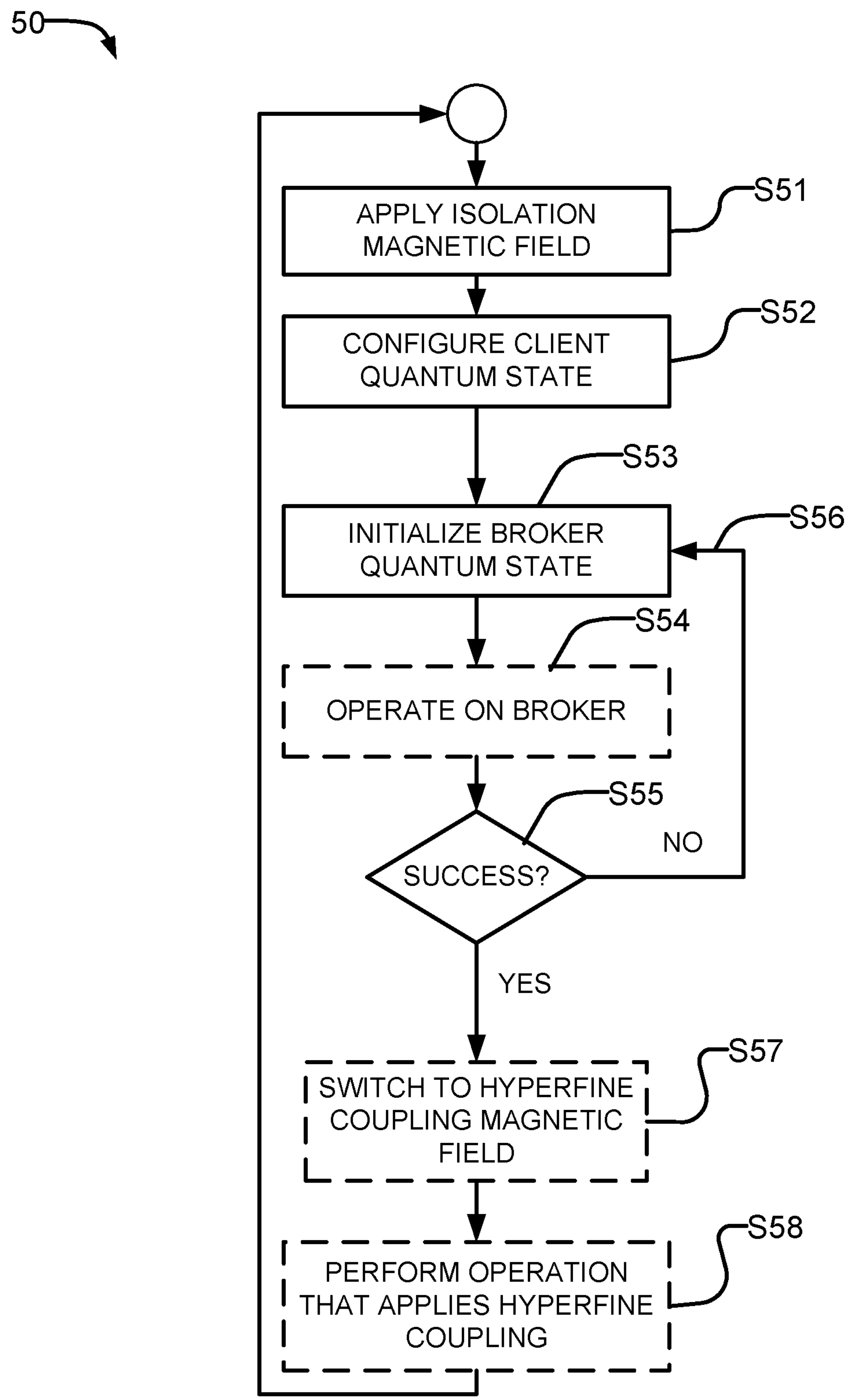
FIG. 5 is a flowchart illustrating a method according to an example embodiment.

FIG. 5 is a flowchart illustrating a method 50 according to an example embodiment. In block S51 the direction and magnitude of an applied magnetic field are set to have values that suppress or eliminate hyperfine coupling between a client quantum system and a broker quantum system (an isolation magnetic field). The magnitude and orientation of the isolation field may be selected as described above. In some embodiments a controller stores control values for controlling a source of magnetic field to generate the isolation magnetic field and block S51 comprises using the stored control values to cause the source to generate the magnetic field that suppresses or eliminates the hyperfine interaction between the broker and client quantum systems.

In block S52 the client quantum system is configured in a quantum state that represents information. In some embodiments, blocks S51 and S52 may be performed at the same time. Block S52 may, for example, comprise any of: teleporting a quantum state to the client quantum system; applying a quantum gate to the client quantum system; manipulating the quantum state of the client quantum system using optical and/or radiofrequency pulses; entangling the quantum state of the client quantum system with some other quantum system etc.

In block S53 the broker quantum system is initialized. Initialization may, for example comprise delivering an optical pulse to the broker quantum system. The frequency (or equivalently wavelength) of the optical pulse may be selected to correspond to the energy required for an optical transition from one basis state of the broker quantum system to an excited state of the broker quantum system. A duration of the optical pulse may be selected so that given the intensity of the optical pulse and the lifetime of the excited state of the broker quantum system the likelihood that the broker quantum system will be in a particular basis state at the end of the optical pulse is at least a threshold probability (e.g. a threshold probability in the range of 70% to 100%).

Block S54 optionally performs other operations on the broker quantum system. For example, block S54 may comprise performing a heralded entanglement protocol to entangle the quantum state of the broker quantum system and the quantum state of another quantum system, performing quantum gates on the broker quantum system, teleporting a quantum state to or from the broker quantum system etc.

Block S55 determines whether the operation(s) of blocks S53 and/or S54 on the broker quantum system are successfully completed (YES) result or not successfully completed (NO result). In the case of the NO result, method 50 returns to block S53 by path S56.

In the case of the YES result, method 50 proceeds to optional block S57 which changes the magnetic field applied to the broker client system to reestablish hyperfine coupling between the broker quantum system and the client quantum system. In some embodiments a controller stores control values for controlling a source of magnetic field to generate the magnetic field that allows hyperfine coupling between the broker and client quantum systems and block S57 comprises using the stored control values to cause the source to generate the magnetic field that facilitates hyperfine coupling between the broker and client quantum systems.

In optional block S58 one or more operations that utilizes hyperfine coupling between the client and broker quantum systems is performed.

After block S58 method 50 may return to block S51 or terminate.

Method 50 may be varied. For example, any of the optional blocks may be omitted. As another example, block S51 may be moved as long as the isolation magnetic field is being applied while operations are being performed on the broker that are likely to contribute to decoherence of the quantum state of the client quantum system.

As another example, the isolation magnetic field may be maintained at all times except when it is desired (if ever) for the client and broker quantum systems to be coupled by the hyperfine interaction.

Example Apparatus

Figure 6:
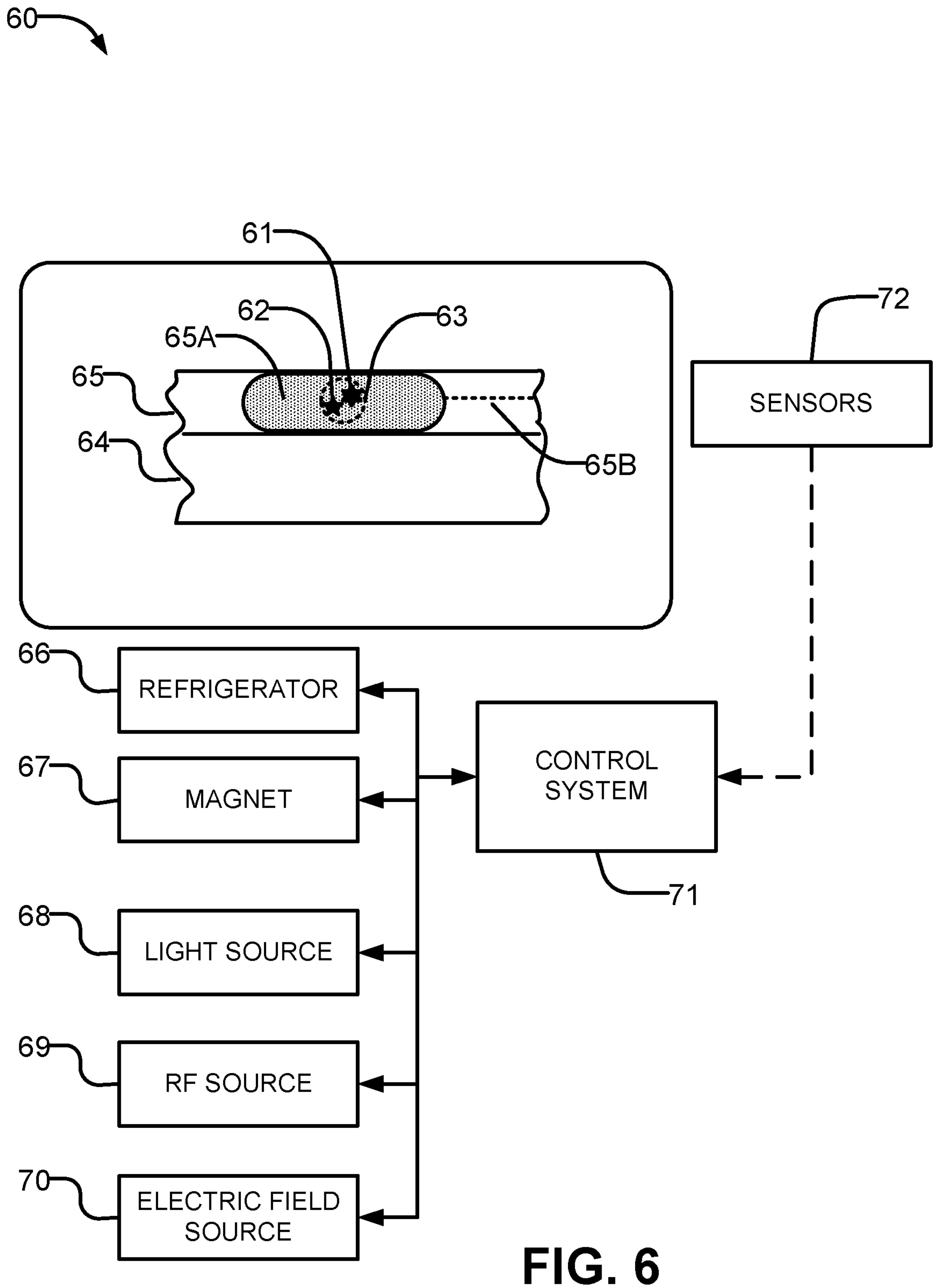
FIG. 6 is a schematic diagram that shows components of an apparatus according to an example embodiment.

FIG. 6 shows apparatus 60 according to an example embodiment. Apparatus 60 includes a crystalline substrate 64. Substrate 64 may, for example, comprise diamond, silicon, or gallium arsenide. A broker quantum system 61 and at least one client quantum system 62 that is local to broker quantum system 61 (collectively broker-client system 63) are located in or on substrate 64. Broker quantum system 61 and client quantum system 62 may, for example be respectively provided by an electron spin and a nuclear spin of a colour centre or luminescenT-centre in substrate 64.

Apparatus 60 includes an integrated optical layer 65 on substrate 64 that includes optical elements that are optically coupled to broker client system 63. In the illustrated embodiment the optical elements include an optical resonator 65A that is coupled to broker-client system 63 and a waveguide 65B that is operative to optically connect optical resonator 65A to other optical apparatus.

Broker-client system 63 may be located in or on substrate 64 in close proximity to optical resonator 65A or waveguide 65B or in or on optical layer 65 in or on or in close proximity to optical resonator 65A or optical waveguide 65B.

Apparatus 60 includes systems for setting operating conditions for broker-client system 63. In system 60 these include: a cryogenic refrigerator 66, a magnet 67 operable to provide a static magnetic field having a controllable spatial orientation and magnitude, a light source 68 operable to deliver light having a wavelength selected for optical pumping of broker quantum system 61, a RF (radiofrequency) source 69 operable to provide a desired RF field at broker-client system 63, an electric field source 70 operable to provide an electric field at broker-client system 63. RF source 69 may, for example, comprise a microwave source that may be controlled to set or manipulate a quantum state of client quantum system 63.

A control system 71 is connected to control operation of apparatus 60. Control system 71 may, for example, be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these.

Examples of specifically designed hardware are: logic circuits, application-specific integrated circuits ("ASICs"), large scale integrated circuits ("LSIs"), very large scale integrated circuits ("VLSIs"), and the like.

Examples of configurable hardware are: one or more programmable logic devices such as programmable array logic ("PALs"), programmable logic arrays ("PLAs"), and field programmable gate arrays ("FPGAs").

Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Control system 71 may be an integrated system or may comprise separate units that operate independently and/or in coordination to control operation of apparatus 60.

For example, control system 71 may be configured to control apparatus 60 to reset broker quantum system 61 by coordinating a sequence of operations that includes: controlling magnet 67 to apply the isolation magnetic field to broker-client system 63; while the isolation magnetic field is being applied, controlling light source 68 to deliver a pulse of light selected to optically pump broker quantum system 61; after delivery of the pulse of light change the magnitude and/or direction of the magnetic field to permit hyperfine coupling of the client and broker quantum systems. Optionally control system 71 is further configured to control electric field source 70 to apply an electric field to broker-client system 63 during the reset process. The electric field may, for example be selected to cause a transition of broker quantum system 61 to correspond to an energy associated with photons of light source 68.

Controller 71 may store parameters for these operations. The parameters may, for example, include some or all of: magnitude and direction of the magnetic isolation field, magnitude and direction for a magnetic field that provides hyperfine coupling between client quantum system 62 and broker quantum system 61, duration for maintaining the magnetic isolation field, frequency of the pulse of light, duration of the pulse of light, and/or electric field strength for the reset procedure.

In some embodiments, broker-client system 63 includes plural client quantum systems 62 and controller 71 is configured to selectively set parameters for the hyperfine suppression field to protect the quantum state of a selected one of the client quantum systems or to set parameters of the hyperfine suppression field to optimally protect the quantum states of two or more of the client quantum systems.

Example Application of Orientations

Many quantum systems of the type that are incorporated into a crystalline substrate and may be applied as broker-client quantum systems can have plural possible orientations relative to the crystal structure of the crystalline substrate. For example, T-centres may have any of 24 different orientations relative to a silicon substrate.

Apparatus according to some embodiments includes plural broker-client systems in a crystalline substrate that have plural different orientations relative to the substrate. In such cases an isolation magnetic field may be selected to reduce or eliminate hyperfine coupling between client and broker quantum systems in those of the client-broker systems that have one or more selected orientations while permitting hyperfine coupling between client and broker quantum systems in those of the client-broker systems that have other orientations relative to the substrate. Different isolation magnetic field orientations and magnitudes may be specified for different orientations of the client-broker systems.

In such embodiments a system may be operated (e.g. by a controller 71) to select and apply an isolation field for a first group of one or more broker-client systems and to subsequently reset selected broker quantum systems of the first group of broker-client systems. Non-selected broker quantum systems of the first group of broker-client systems and broker-client systems having orientations different from the orientation(s) of the first group of broker-client systems may be unaffected (e.g. may be tuned to not respond to the wavelength of light used to reset the broker quantum systems of the first group of broker-client systems).

Example Applications

An example application of the present technology is to facilitate using spin-photon interfaces as nodes in a quantum network. Such a network may be configured, for example as a distributed quantum computer and/or a quantum communication system. Spin-photon interfaces built on solid state colour centres such as the T-centre in silicon can be photonically-linked by heralded, emission-based entanglement protocols to construct such quantum networks (see Refs. [1-5]).

In cases where a quantum memory such as a coupled nuclear spin is available to the spin-photon interface, broker-client entanglement protocols can be used to facilitate linking multiple nodes on the quantum network [6]. In broker-client entanglement protocols, entanglement is generated between two broker qubits (typically electron spins) using protocols such as those described in Refs. [4,5]. The two-qubit entangled state can then be stored in the quantum memory of the nuclear spin (the client), freeing up the broker spin to generate entanglement with another broker on the quantum network. In this way, multi-node quantum networks can be constructed [2,3].

Because many emission-based entanglement schemes are probabilistic in nature, a broker-client protocol also provides a layer of protection against the inevitable occurrence of failed entanglement attempts. Without a client storing the networked quantum state, a failed entanglement attempt would collapse a pair of brokers into unknown quantum states, removing those brokers from the networked state. By storing the networked state in client qubits, however, failed broker entanglement attempts can be redressed by simply resetting the broker qubits after each failure until a successful entanglement attempt is heralded. In this way, even with low probabilities of successful entanglement, multi-node quantum states can be constructed on the quantum network.

The technology described herein may be applied, for example, to protect the quantum information stored in nuclear spins or other client quantum systems from experiencing loss of fidelity (e.g. dephasing) as a result of steps taken to reset associated broker quantum systems (e.g. electron spins) and/or to entangle the broker quantum systems with other quantum systems.

Where a component (e.g. a software module, processor, assembly, device, circuit, etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

The present technology may also be provided in the form of a program product. The program product may comprise any non-transitory medium which carries a set of computer-readable instructions which, when executed by a data processor, cause the data processor to execute a method of the invention. For example, the data processor may be a data processor of a control system and the computer-readable instructions may cause the control system to execute a method as described herein (e.g. a method for resetting a broker quantum system). Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or pre-programmed chips (e.g., EEPROM semiconductor chips), nanotechnology memory, or the like. The computer-readable signals on the program product may optionally be compressed or encrypted.

Interpretation of Terms

Unless the context clearly requires otherwise, throughout the description and the claims:

- "comprise", "comprising", and the like are to be construed in an inclusive sense, as opposed to an exclusive or exhaustive sense; that is to say, in the sense of "including, but not limited to";
- "connected", or any variant thereof, means any connection, either direct or indirect, between two or more elements; the connection between the elements can be physical, logical, or a combination thereof;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;
- the singular forms "a", "an", and "the" also include the meaning of any appropriate plural forms. These terms ("a", "an", and "the") mean one or more unless stated otherwise;
- "and/or" is used to indicate one or both stated cases may occur, for example A and/or B includes both (A and B) and (A or B);
- "approximately" when applied to a numerical value means the numerical value±10%;
- where a feature is described as being "optional" or "optionally" present or described as being present "in some embodiments" it is intended that the present disclosure encompasses embodiments where that feature is present and other embodiments where that feature is not necessarily present and other embodiments where that feature is excluded. Further, where any combination of features is described in this application this statement is intended to serve as antecedent basis for the use of exclusive terminology such as "solely," "only" and the like in relation to the combination of features as well as the use of "negative" limitation(s)" to exclude the presence of other features; and "first" and "second" are used for descriptive purposes and cannot be understood as indicating or implying relative importance or indicating the number of indicated technical features.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a range for a value is stated, the stated range includes all sub-ranges of the range. It is intended that the statement of a range supports the value being at an endpoint of the range as well as at any intervening value to the tenth of the unit of the lower limit of the range, as well as any subrange or sets of sub ranges of the range unless the context clearly dictates otherwise or any portion(s) of the stated range is specifically excluded. Where the stated range includes one or both endpoints of the range, ranges excluding either or both of those included endpoints are also included in the invention.

Certain numerical values described herein are preceded by "about". In this context, "about" provides literal support for the exact numerical value that it precedes, the exact numerical value±5%, as well as all other numerical values that are near to or approximately equal to that numerical value. Unless otherwise indicated a particular numerical value is included in "about" a specifically recited numerical value where the particular numerical value provides the substantial equivalent of the specifically recited numerical value in the context in which the specifically recited numerical value is presented. For example, a statement that something has the numerical value of "about 10" is to be interpreted as: the set of statements:

in some embodiments the numerical value is 10;

in some embodiments the numerical value is in the range of 9.5 to 10.5;

and if from the context the person of ordinary skill in the art would understand that values within a certain range are substantially equivalent to 10 because the values with the range would be understood to provide substantially the same result as the value 10 then "about 10" also includes:

in some embodiments the numerical value is in the range of C to D where C and D are respectively lower and upper endpoints of the range that encompasses all of those values that provide a substantial equivalent to the value 10

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

As will be apparent to those of skill in the art upon reading this disclosure, each of the individual embodiments described and illustrated herein has discrete components and features which may be readily separated from or combined with the features of any other described embodiment(s) without departing from the scope of the present invention.

Any aspects described above in reference to apparatus may also apply to methods and vice versa.

Any recited method can be carried out in the order of events recited or in any other order which is logically possible. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, simultaneously or at different times.

Various features are described herein as being present in "some embodiments". Such features are not mandatory and may not be present in all embodiments. Embodiments of the invention may include zero, any one or any combination of two or more of such features. All possible combinations of such features are contemplated by this disclosure even where such features are shown in different drawings and/or described in different sections or paragraphs. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible). This is the case even if features A and B are illustrated in different drawings and/or mentioned in different paragraphs, sections or sentences.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A quantum information system comprising:

a physical broker-client system comprising a client quantum system, and a broker quantum system wherein a first hyperfine interaction between the client quantum system and the broker quantum system is anisotropic and there exists at least a first direction in space relative to the locations of the client quantum system and broker quantum system for which a magnitude of an effective hyperfine constant is zero when a magnetic field is aligned with the first direction in space;

a magnet configured to apply to the broker-client system a first magnetic field along a direction that is substantially aligned with the first direction;

a controller configured to cause a change in a quantum state of the broker quantum system while the magnet is applying the first magnetic field.

2. The system according to claim 1 wherein the controller is configured to reset the quantum state of the broker quantum system while the magnet is applying the first magnetic field by applying a pulse of light to the broker-client system, the pulse of light having a wavelength corresponding to a transition of the broker quantum system to an excited state.

3. The system according to claim 1 wherein the controller is configured to control the magnet to apply the first magnetic field or a third magnetic field having a direction and magnitude, wherein a strength of the first hyperfine interaction between the client quantum system and the broker quantum system is greater in the presence of the third magnetic field than in the presence of the first magnetic field.

4. The system according to claim 1 wherein a strength of the first hyperfine interaction for different directions of an applied magnetic field is characterized by values of the effective hyperfine constant determined by a hyperfine tensor having the property that there exist different directions of the applied magnetic field for which corresponding values of the effective hyperfine constant have different signs.

5. The system according to claim 1 wherein the broker-client system comprises a luminescence centre.

6. The system according to claim 5 wherein the luminescence centre comprises a T-centre.

7. The system according to claim 1 wherein the broker quantum system and the client quantum system are respectively provided by an intrinsic spin of a first particle and an intrinsic spin of a second particle.

8. The system according to claim 7 wherein the broker quantum system comprises an electron spin and the client quantum system comprises a nuclear spin.

9. The system according to claim 1 wherein the broker-client system is in or on a substrate and the system comprises a photonic layer on the substrate wherein the broker quantum system is optically coupled to an optical resonator and/or an optical waveguide of the photonic layer.

10. The system according to claim 9 wherein the optical resonator is tuned to a frequency corresponding to a transition from one of a plurality of ground state energy levels of the broker quantum system to an excited state of the broker quantum system.

11. The system according to claim 10 wherein the excited state of the broker quantum system comprises an exciton.

12. The system according to claim 1 wherein the client quantum system is a first client quantum system and the physical broker-client system comprises a second client quantum system wherein a second hyperfine interaction between the broker quantum system and the second client system is anisotropic and there exists at least a second direction in space relative to the locations of the second client quantum system and broker quantum system for which an effective hyperfine constant for the second hyperfine interaction is zero and the controller is configured to control the magnet to selectively apply the first magnetic field or a second magnetic field substantially aligned with the second direction.

13. The system according to claim 1 wherein the client quantum system is a first client quantum system and the physical broker-client system comprises a second client quantum system wherein a second hyperfine interaction between the broker quantum system and the second client quantum system is anisotropic, wherein:

there exists a first trajectory in spherical coordinate space such that when a magnetic field is aligned with any direction on the first trajectory an effective hyperfine constant for the hyperfine interaction between the broker quantum system and the first client quantum system is zero;

there exists a second trajectory in spherical coordinate space such that when a magnetic field is aligned with any direction on the second trajectory an effective hyperfine constant for the second hyperfine interaction is zero; and the controller is configured to cause the magnet to apply a magnetic field to the broker-client system that has a direction that is within five degrees of:

a) a direction corresponding to an intersection of the first and second trajectories; or b) a direction corresponding to the centre of a line extending between the points on the first and second trajectories that correspond to the smallest angular distance between the first and second trajectories.

14. A method for protecting a quantum state of a client quantum system of a broker-client system comprising the client quantum system and a broker quantum system wherein a hyperfine interaction between the client quantum system and the broker quantum system is anisotropic and characterized by a hyperfine tensor such that an effective hyperfine constant has a magnitude that depends on an orientation of an applied magnetic field relative to the locations of the client quantum system and broker quantum system;

the method comprising:

suppressing the hyperfine interaction by applying a first magnetic field to the broker-client system that has a magnitude and orientation selected to cause the effective hyperfine constant to have a first magnitude that is less than 10% of a largest principal value magnitude of the hyperfine tensor;

and while the hyperfine interaction is suppressed, altering a quantum state of the broker quantum system.

15. The method according to claim 14 wherein altering the quantum state of the broker quantum system comprises optically exciting the broker quantum system.

16. The method according to claim 14 wherein altering the quantum state of the broker quantum system comprises resetting the quantum state of the broker quantum system to a predetermined initial quantum state.

17. The method according to claim 14 comprising, subsequent to changing the quantum state of the broker quantum system, changing the magnetic field to a second magnetic field having a magnitude and orientation selected to cause the effective hyperfine constant to have a second magnitude that is greater than the first magnitude.

18. The method according to claim 17 wherein the first magnitude of the effective hyperfine constant is not more than 10% of the second magnitude of the effective hyperfine constant.

19. A method for maintaining fidelity of a quantum state of a client quantum system, the method comprising:

providing a node comprising a client quantum system and a broker quantum system and characterized by an anisotropic local interaction between the client quantum system and the broker quantum system, the anisotropic local interaction having a value that depends on an orientation of an applied magnetic field relative to the locations of the client quantum system and broker quantum system and ranges from a minimum value to a maximum value, where a value of zero indicates a minimum interaction strength; and;

suppressing the local interaction between the client quantum system and the broker quantum system by applying a magnetic field having a magnitude and direction selected to cause the strength of the local interaction to be 0±10% of the difference between the minimum value and the maximum value.

20. The method of claim 19 comprising, while suppressing the local interaction between the client quantum system and the broker quantum system, resetting the broker quantum system and/or executing a protocol to entangle the broker quantum system with another quantum system.

21. The method of claim 19 wherein the maximum value is greater than zero and the minimum value is less than zero.

* * * * *